United States Patent [19]

Rosser et al.

[11] 4,242,498
[45] Dec. 30, 1980

[54] PROCESS FOR THE PREPARATION OF FLUORINE CONTAINING CROSSLINKED ELASTOMERIC POLYTRIAZINE AND PRODUCT SO PRODUCED

[76] Inventors: Robert A. Frosch, Administrator of the National Aeronautics and Space Administration, with respect to an invention of Robert W. Rosser, San Jose, Calif.; Roger A. Korus, Moscow, Id.

[21] Appl. No.: 28,300

[22] Filed: Apr. 9, 1979

[51] Int. Cl.³ ............................................. C08G 63/44
[52] U.S. Cl. .................................. 528/362; 528/401; 528/422; 528/423
[58] Field of Search ............................................ 528/362

[56] References Cited
PUBLICATIONS

Fluoropolymers, High Polymers, vol. XXV, 1972, Wall, pp. 267–289, 307–315.

*Primary Examiner*—Harold D. Anderson
*Attorney, Agent, or Firm*—Armand McMillan; John R. Manning; Darrell G. Brekke

[57] ABSTRACT

New crosslinked elastomeric polytriazines have been prepared by a 4-step procedure which consists of: (1) forming a poly(imidoylamidine) by the reaction under reflux conditions of anhydrous ammonia with certain perfluorinated alkyl or alkylether dinitriles; (2) forming a linear polytriazine by cyclizing the imidoylamidine linkages by reaction with certain perfluorinated alkyl or alkylether acid anhydrides or halides; (3) extending the linear polytriazine chain by further refluxing in anhydrous ammonia; and (4) heating to cyclize the new imidoylamidine linkages and thereby crosslink the polymer.

8 Claims, No Drawings

PROCESS FOR THE PREPARATION OF FLUORINE CONTAINING CROSSLINKED ELASTOMERIC POLYTRIAZINE AND PRODUCT SO PRODUCED

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention relates to perfluoroalkylenetriazine polymers and more particularly to a new method for preparing them.

2. Description of the Prior Art

Perfluoroalkylenetriazine polymers have been prepared heretofore by two different methods, namely the acylationcyclodehydration of imidoylamidines and the free radical coupling of preformed triazine derivatives. However, these polymerization methods have so far yielded polymer specimens that show disappointing material properties [Fluoropolymers, High Polymers Volume XXV, edited by Leo A. Wall, Wiley-Interscience (1972), pages 267 to 289 and 307 to 315; hereafter cited as Fluoropolymers]. In the case of the first and most intensively investigated method, the imidoylamidine approach, it has generally been found to be "very sensitive to reaction conditions, afford poor reproducibility, and yield polymers of molecular weights only marginally high enough for good physical properties." (Fluoropolymers, page 288). In fact, this approach is said to fail "because the ammonia liberated during cyclization causes reorganization reactions, randomizing the assimilation of mono- and difunctional compounds into triazine rings, altering the functionality of the reaction system, and leading to undesired cross-linking and shortened chains." (Fluoropolymers, page 276). As to the second method, coupling of preformed triazine rings, synthetic difficulties and poor reactivity have led to polymers that are not elastomeric at room temperature, due to the shortness of the chains between the triazine rings (Fluoropolymers, page 280). In the circumstances, the principal object of the present invention is to provide an improved process which can yield the quality of polymer envisaged by the pioneers in this art.

SUMMARY OF THE INVENTION

It has now been found that new polyperfluoroalkyltriazines that are elastic at room temperature can be made by a new four-step process which affords control of molecular weight and extent of crosslinking in a reproducible manner. As compared to the materials of the art, the new polymers have high molecular weights and benefit from superior physical properties for elastomeric applications, lower glass transition temperature, superior hydrolytic stability, and broader use temperature range. The new process disclosed herein is actually an improvement of the imidoylamidine approach which involves (1) the reaction of ammonia with a perfluorodinitrile, (2) the cyclization of the poly(imidoylamidine) with an acyl anhydride or an acyl halide, (3) a further chain lengthening reaction between ammonia and the nitrile group terminated polytriazine molecules, and finally (4) heat treating the latter product to cyclize the newly formed imidoylamidine linkages and crosslink the polymer.

DETAILED DESCRIPTION OF THE INVENTION

The four reactions that constitute the process of the present invention can be illustrated by the following formulas and equations:

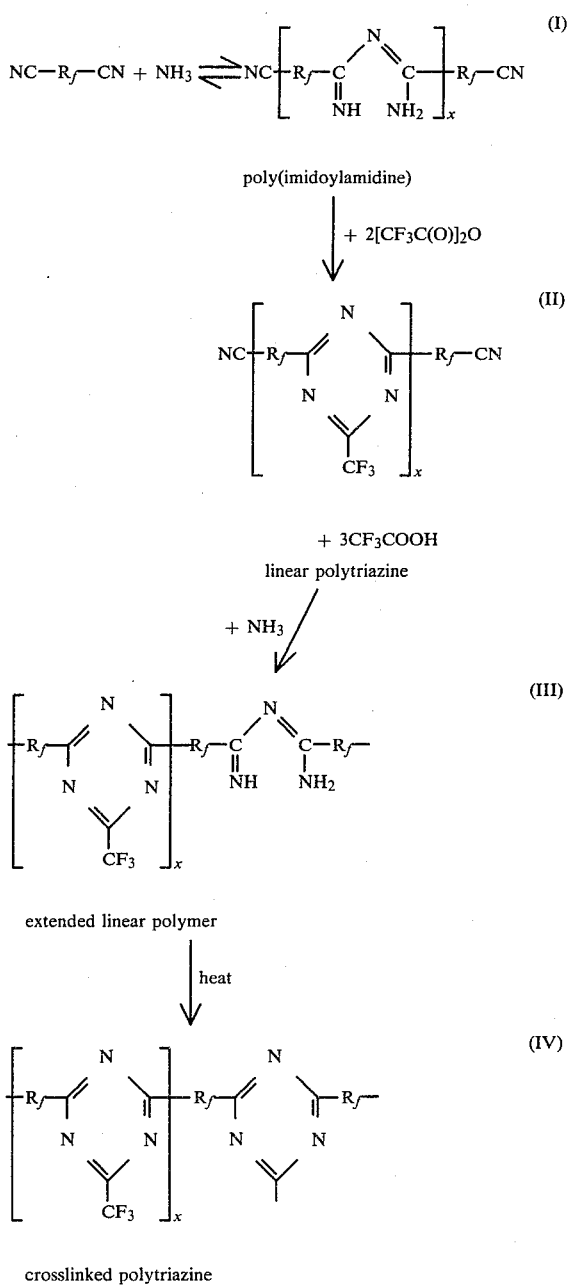

In the above formulas, $R_f$ represents identical bivalent perfluorinated organic radicals or any combination of bivalent perfluorinated organic radicals, said radicals being selected from the group consisting of: $-(CF_2)_p-$ wherein p ranges from 2 to 18; and oligomeric or polymeric radicals prepared by the reaction of a perfluorinated dicarboxylic acid halide with a perfluoroepoxide and having the formula:

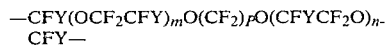
$$-CFY(OCF_2CFY)_mO(CF_2)_pO(CFYCF_2O)_n-CFY-$$

wherein Y is a fluorine atom or a trifluoromethyl group, p ranges from 1 to 18, and m+n ranges from 2 to 7.

Instead of the trifluoroacetic acid anhydride shown in reaction II above, other cyclizing agents may be employed including the anhydrides, the acyl fluorides, and the acyl chlorides of the perfluorinated lower aliphatic acids containing up to about 12 carbons, and of the oligomeric and polymeric acids having the formula

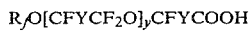
$$R_fO[CFYCF_2O]_yCFYCOOH$$

wherein $R_f$ is a perfluorinated lower alkyl group containing up to 3 carbons, Y is fluorine or a trifluoromethyl group, y is any integer up to about 50. The proportions of cyclizing agent to poly(imidoylamidine) are essential stoichiometric, although an excess of the cyclizing agent may be employed if desired.

The molecular weight of the linear poly(imidoylamidine) formed by reaction I is controlled to some extent by the reaction time which can vary between about 4 hours and 4 days, depending on the materials used and the conditions employed. The shorter reaction times within these limits are preferred. The linear polytriazines obtained from reaction II should typically have a molecular weight of about 15,000 to 30,000 when the ring closing agent used is a derivative of trifluoroacetic acid, said molecular weight increasing so as to form an elastomeric network upon crosslinking according to reaction IV.

In any event, the modulus of the final elastomer, i.e. the crosslinked polytriazine, is dependent upon the average molecular weight between crosslinks, $\overline{M}$. The optimum value for $\overline{M}$ is one within the range of 15,000 to 30,000. When $\overline{M} \leq 10,000$, the product is cheesy and unacceptable, having a modulus greater than $10^8$ dynes/cm$^2$. When $\overline{M}$ is $\geq 30,000$, on the other hand, the product is viscoelastic.

The reactions which constitute the process of the invention will now be described in greater operational detail by means of the following examples which illustrate, inter alia, the best mode of practicing the invention and yet are not intended as limits to said process. In these examples, all proportions and percentages are on a weight basis unless otherwise indicated.

EXAMPLE 1

A triazine elastomer was prepared using the α,ω-dinitrile of a perfluoroalkylene oxide as a starting material. The dinitrile had the following formula:

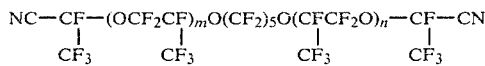
$$NC-CF-(OCF_2CF)_mO(CF_2)_5O(CFCF_2O)_n-CF-CN$$
$$\phantom{NC-}|\phantom{CF-(OCF_2}|\phantom{CF)_mO(CF_2)_5}|\phantom{O(CFCF_2O)_n-}|$$
$$\phantom{NC-}CF_3\phantom{-(OC}CF_3\phantom{F_2CF)_mO(CF}CF_3\phantom{_2)_5O(CFCF_2O)_n-}CF_3$$

wherein m+n=6.

Reaction I.

The dinitrile, 33.84 g, was placed into a three-neck flask connected to a Dewar condenser and to sources of nitrogen and ammonia gas. The system was purged with nitrogen for ten minutes. Ammonia gas was introduced under reflux conditions for 3 hours and 35 minutes. The ammonia was then vented and the flask sealed for 3 days with some ammonia remaining in it. A viscous polymer was obtained having an intrinsic viscosity of 8.25 ml/g and a ratio of IR absorbancies at 1600 cm$^{-1}$/2260 cm$^{-1}$ of 41.

Reaction II.

The viscous polymer was dissolved in Freon 113, 1,1,2-trichlorotrifluoroethane. This solution was added slowly, over a period of 15 to 20 minutes to an amber bottle containing 11.4 g trifluoroacetic anhydride. More anhydride, 2.0 g, was placed in the flask to complete ring closure, and this was left standing overnight. The Freon 113 was then removed by distillation, leaving a residue which separated into layers. The upper layer, mainly composed of trifluoroacetic acid, was removed with a Pasteur pipette and the remaining material was placed in a vacuum oven at 90° C. for 2 hours. The linear polytriazine thus obtained weighed 35.92 g and had a weight average molecular weight of 23,000 as determined by high pressure liquid chromatography (HPLC).

Reaction III.

The linear triazine polymer was placed in a three-neck flask and exposed to ammonia gas for 4 hours essentially in the manner of reaction I. The flask was sealed and left overnight.

Reaction IV.

The viscous content of the flask was then heated from 130° to 200° C. over a 4 day period to yield an elastomeric product with a modulus of $10^5$ Nm$^{-2}$ (as measured on a du Pont thermomechanical analyzer, Model 943). The material had a light amber color, was tacky, and had a high extensibility. On heating at 300° C. for 20 hours in air or nitrogen, a weight loss of only 2% took place, as measured by thermogravimetric analysis.

EXAMPLE 2

The method of Example 1 was repeated using the same reactants and equipment, except for the following changes. In the preparation of the imidoylamidine polymer (Reaction I), 2.6 g of the dinitrile was reacted with ammonia gas under reflux conditions for 3 hours. After this, the remaining ammonia was vented, the flask purged with nitrogen, dry ice added to the condenser, and ammonia introduced into the flask again. The flask was kept in a waterbath at 8° C. for 3 hours and 15 minutes, i.e. until the dry ice was exhausted. The ammonia was vented, leaving a viscous residue with an intrinsic viscosity of 9.5 ml/g. IR analysis showed a very weak nitrile peak at 2260 cm$^{-1}$ and strong imidoylamidine peaks at 1520, 1600, and 1650 cm$^{-1}$. The ratio of absorbancies at 1600 cm$^{-1}$/2260 cm$^{-1}$ equalled 60.

Reaction II.

The linear polymer, 0.49 g, was placed in a flask with 0.15 g trifluoroacetic anhydride and the mixture dissolved in 3 ml Freon 113. The solution was stirred overnight. More anhydride was then added, 0.1 g, and the solution left open at room temperature for 24 hours to allow escape of the Freon 113. The flask was heated at 60° C. under vacuum for 2 hours to remove volatile reaction products. According to HPL chromatography, the linear polytriazine had a weight average molecular weight of 28,000. The IR spectrum showed no imidoylamidine peaks and a strong triazine peak at 1550 cm$^{-1}$.

Reaction III.

The very viscous linear polytriazine was exposed to ammonia for 3 hours, as before. The flask was then closed with ground glass stoppers and left overnight.

Reaction IV.

The very viscous gum-like material was heated under partial vacuum (ca 0.5 atmosphere) from 110° to 200° C. over 5 days. The resulting light amber gum had a modulus of $10^4$ Nm$^{-2}$ and a sol fraction of 1.0. It was extremely tacky.

EXAMPLE 3

Again, the dinitrile was converted to poly(imidoylamidine) in an excess of refluxing ammonia. When the average degree of polymerization x, reached the range of 5 to 25, the material dissolved in Freon 113 was converted to the polytriazine in an amber bottle, using trifluoroacetic anhydride at a level >0.3 times the weight of poly(imidoylamidine). The solvent was distilled off at 47°–48° C., the trifluoroacetic acid removed, and the polymer heated to 90° C. at 30 inch Hg with continuous pumping for 3 hours. The linear polytriazine was treated again with excess ammonia (reaction III) to yield an elastic material which flowed at 110° to 120° C. This was heated from 110° to 140° C. for 3 to 4 days to crosslink and to 150° C. to complete the process (reaction IV). All procedural steps employed in this example, except those just described, were identical to those of Example 1.

The molecular weight of the linear polytriazine obtained by reaction II was 22,000, as measured by gel permeation chromatography and viscometry. There is no change in molecular weight with ring closure. The crosslinked material obtained had a glass transition temperature of −45° C., by differential scanning calorimetry. Extraction in refluxing JP-4 fuel for 24 hours resulted in a 1% weight loss. The material exhibited thermal stability in nitrogen and in air at 300° to 350° C. with little or no change in elastomeric properties. Thermogravimetric analysis in nitrogen showed a breakpoint about 330° C.

EXAMPLE 4

Another preparation using the same materials employed in the previous examples but limiting reaction I time to 38 minutes, yielded a poly(imidoylamidine) with an IR spectrum ratio of absorbancies at 1600 cm$^{-1}$/2260 cm$^{-1}$ equal to 2 and an intrinsic viscosity of 5.0 ml/g. Cyclization with trifluoroacetic anhydride produced a linear polytriazine with a weight average molecular weight of 8600. Chain extension and crosslinking at 100° to 200° C. over a 7 day period yielded a cheesy material with a very low tear strength, low extensibility, and a modulus of $10^8$ Nm$^{-2}$.

EXAMPLE 5

The dinitrile used in Example 1, 53.8 g, was sealed in a glass ampoule with a trace of anhydrous ammonia (~0.0006 mole). After 7 days in a 225° C. oil bath, a quantitative conversion to a clear, cheese-like polymer was obtained.

EXAMPLE 6

The dinitrile of Example 1, 12.5 g (8.17 mmoles) was placed in an addition funnel and added dropwise to flask containing 100 ml anhydrous ammonia at reflux temperature. At the completion of the addition, the excess ammonia was vented leaving an extremely viscous liquid shown by infrared to be the diamidine. Freon 113, 50 ml, was added to the flask. Then more of the dinitrile, 12.5 g (8.17 mmoles), was added dropwise to the stirred diamidine solution. The solution was stirred for two more hours after completion of the addition. At this time, infrared showed the appearance of imidoylamidine bands and the disappearance of amidine bands. A small portion, 5 ml, of this solution was treated with excess trifluoroacetic acid anhydride, 5 ml, at 25° C. After the reaction mixture had been stirred overnight, the solvent was removed in vacuo, leaving 2.0 g of thick syrup which showed only triazine bands in the infrared spectrum.

EXAMPLE 7

The four-reaction procedure of Example 1 was followed again with the principal change that an acyl fluoride was employed in reaction II instead of trifluoroacetic acid anhydride. Other less significant changes were made in materials and quantities, although proportions were substantially preserved.

The perfluoroalkelene oxide dinitrile used was similar to that of Example 1, except that its m+n value was 7. The dinitrile, 3 g (1.61 mmoles), was placed into a 3-neck flask. Anhydrous ammonia was purged into the flask for two hours to yield a product that showed infrared imidoylamidine peaks at 6.09, 6.28, and 6.12 μm. Nitrile groups were also present as shown at 4.43 μm. The material was dissolved in 1,1,2-trichlorotrifluoroethane (Freon 113), 30 ml, and an acyl fluoride-C$_3$F$_7$O[CFCF$_3$CF$_2$O]$_2$CFCF$_3$COF, 2 g, was added slowly from a dropping funnel. All glassware was wrapped with aluminum foil. After completion of the addition, the mixture was stirred overnight. The linear polytriazine thus obtained showed a strong triazine peak at 6.45 μm.

EXAMPLE 8

This preparation again was essentially that of Example 1, except that a perfluoroalkyldinitrile, [NC—(CF$_2$)$_3$—CN], was used and perfluorocaprylic acid anhydride was substituted for trifluoroacetic acid anhydride. The quantities were 2.02 g (10 mmoles) for the perfluoroglutaryl nitrile and 2.02 g (25 mmoles) for the anhydride. The reactions were carried out as in Example 1, proportions respected, to yield an elastomeric substance showing a triazine peak at 6.45 μm in the IR spectrum.

The crosslinked polymers prepared by the method of this invention are tough, elastic, heat and chemical resistant substances which can be used in many demanding applications such as fuel tank sealants, O-rings, wire enamels, pneumatic ducts and edge close-outs in aircraft, and so on. Other uses for the products, as well as variations in the materials and procedures disclosed, can be devised by the man skilled in the art without departing from the spirit of the invention as described by the following claims.

What is claimed is:

1. A process for preparing a crosslinked elastomeric polytriazine, which comprises:

(a) forming a polyimidoylamidine by the reaction of anhydrous ammonia under reflux conditions with a dinitrile compound selected from the group consisting of perfluoroalkyl dinitriles having the formula NC—$(CF_2)_p$—CN, wherein p ranges from 2 to 18, and the dinitriles of oligomeric and polymeric compounds having the formula NC—$CFY(OCF_2CFY)_mO(CF_2)_pO(CFYCF_2O)_n$-CFY—CN wherein Y is fluorine or trifluoromethyl, p ranges from 1 to 18 and m+n ranges from 2 to 7;

(b) forming a linear polytriazine by treating the polyimidoylamidine with a ring-closing reagent selected from the group consisting of the acyl halides and anhydrides of the perfluorinated lower aliphatic acids containing up to about 12 carbons, and of the oligomeric and polymeric acids having the formula $R_fO(CFYCF_2O)_yCFYCOOH$ wherein $R_f$ is a perfluorinated lower alkyl group containing up to about 3 carbons, Y is fluorine or a trifluoromethyl group, and y is an integer within the range of 0 to about 50;

(c) extending the linear polytriazine chain by treatment with anhydrous ammonia under reflux conditions to form additional imidoylamidine linkages; and (d) heating the extended polymer at a temperature within the range of about 100° to 200° C. for a period of up to 4 days to cyclize the imidoylamidine linkage and crosslink the polymeric chain.

2. The process of claim 1, wherein the dinitrile used has an m+n value within the range of 3 to 7.

3. The process of claim 1, wherein the reaction between the dinitrile and the anhydrous ammonia is allowed to proceed for a period within the range of about 4 hours to 4 days.

4. The process of claim 1, wherein the ring closing agent is trifluoroacetic acid anhydride.

5. The process of claim 1, wherein the ring closing agent is $C_3F_7(CFCF_3CF_2O)_2CFCF_3COF$.

6. A crosslinked elastomeric polytriazine having the formula

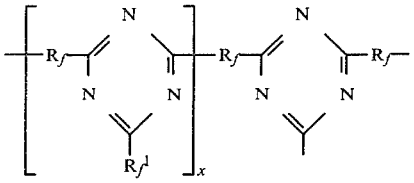

wherein (1) $R_f$ is a bivalent radical selected from the group consisting of (a)-$(CF_2)_p$-wherein p ranges from 2 to 18, and (b) oligomeric or polymeric radicals having the formula —$CFY(OCF_2CFY)_mO(CF_2)_pO(CFYCF_2O)_m$-CFY— wherein Y is fluorine or a trifluoromethyl group, p ranges from 1 to 18 and m+n ranges from 2 to 7; and (2) $R_f^1$ is a monovalent perfluorinated alkyl radical containing up to 11 carbons; x being an integer such that said polytriazine has an average molecular weight $\overline{M}$ between crosslinks within the range of 10,000 to about 30,000, as measured by gel permeation chromatography.

7. A polytriazine of claim 6, wherein $R_f^1$ is a monovalent perfluorinated alkylether radical having the formula $R_f^2O(CFYCF_2O)_yCFY—$ wherein $R_f^2$ is a perfluorinated alkylgroup containing up to 3 carbons, Y is fluorine or a trifluoromethyl group, and y is an integer ranging from 0 to about 50.

8. The polytriazine of claim 6 or 7 wherein $\overline{M}$ is within the range of 15,000 to 30,000, as measured by gel permeation chromatography.

* * * * *